US012286976B2

(12) United States Patent
Lesicko et al.

(10) Patent No.: US 12,286,976 B2
(45) Date of Patent: Apr. 29, 2025

(54) MOTOR CONTROL SYSTEM PROVIDING SINGLE OUTPUT SIGNAL AND HIGH NUMBER OF SPEED SETTINGS

(71) Applicant: Nidec Motor Corporation, St. Louis, MO (US)

(72) Inventors: Jared Joseph Lesicko, St. Louis, MO (US); Douglas D. Glenn, Highland, IL (US); Prakash B. Shahi, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 398 days.

(21) Appl. No.: 18/054,629

(22) Filed: Nov. 11, 2022

(65) Prior Publication Data

US 2023/0069028 A1 Mar. 2, 2023

Related U.S. Application Data

(63) Continuation of application No. 17/318,751, filed on May 12, 2021, now Pat. No. 11,566,630.

(60) Provisional application No. 63/024,009, filed on May 13, 2020.

(51) Int. Cl.
*F04D 27/00* (2006.01)
*F04D 25/06* (2006.01)
*F24F 11/77* (2018.01)
*F24F 11/88* (2018.01)
*H01R 13/04* (2006.01)
*H02P 6/26* (2016.01)

(52) U.S. Cl.
CPC ....... *F04D 27/004* (2013.01); *F04D 25/0693* (2013.01); *F24F 11/77* (2018.01); *F24F 11/88* (2018.01); *H01R 13/04* (2013.01); *H02P 6/26* (2016.02); *H01R 2201/10* (2013.01)

(58) Field of Classification Search
CPC ...... F04D 27/004; F04D 25/0693; H02P 6/26; F24F 11/77; F24F 11/88; H01R 13/04; H01R 2201/10
See application file for complete search history.

(56) References Cited

U.S. PATENT DOCUMENTS

| 10,605,495 | B1* | 3/2020 | Falls | F25B 13/00 |
| 2017/0300107 | A1* | 10/2017 | Green | H02M 1/32 |
| 2023/0065986 | A1* | 3/2023 | Broker | F24F 11/30 |

* cited by examiner

*Primary Examiner* — Zoheb S Imtiaz
(74) *Attorney, Agent, or Firm* — Hovey Williams LLP

(57) ABSTRACT

A motor control system providing at least seventeen speed settings using industry standard control signals and an industry standard five pin speed connector. One speed monitoring pin transmits an output signal for monitoring the speed of the motor, and four speed setting pins receive input signals for setting the speed. One of the speed setting pins receives and decodes two binary states and two frequency states, thereby providing a total of thirty-two speed settings. A non-regulated isolated winding is added to an internal transformer to provide an internal isolated flyback power supply for the motor, thereby liberating a pin on the industry standard five pin speed connector to provide the fourth speed setting input pin. Transmission circuitry is associated with the speed monitoring pin, and the non-regulated isolated winding is used to provide a direct current bias to the transmission circuitry.

9 Claims, 5 Drawing Sheets

MOTOR CONTROL SYSTEM PROVIDING SINGLE OUTPUT SIGNAL AND HIGH NUMBER OF SPEED SETTINGS

RELATED APPLICATIONS

The present U.S. non-provisional patent application is a continuation and claims priority of an earlier-filed U.S. non-provisional patent application titled "Motor Control System Providing Single Output Signal and High Number of Speed Settings," filed May 12, 2021, Ser. No. 17/318,751, and of an even earlier-filed provisional patent application titled "Motor Control System Providing Single Output Signal and High Number of Speed Settings," filed May 13, 2020, Ser. No. 63/024,009. The entire contents of the identified earlier-filed applications are incorporated by reference as if fully set forth herein.

FIELD

The present invention relates to electric motors and motor controllers, and more particularly, embodiments concern a motor control system with at least seventeen motor speed settings using industry standard control signals and an industry standard five pin speed connector.

BACKGROUND

Manufacturers of heating, ventilation, and air conditioning (HVAC) systems desire to increase the number of discrete speed settings available on blower motors from the five settings currently available. Additional speed settings are desirable in order to increase comfort for end-users, allow installers to better control torque for improved airflow, and allow manufacturers to reduce the number of different products they provide and support. However, the ability to accept multiple speed inputs is limited by the number of input and output pins on the industry standard five pin speed connector. Currently, only three of the five pins are available for speed inputs, which limits the maximum number of speed settings to eight.

This background discussion is intended to provide information related to the present invention which is not necessarily prior art.

SUMMARY

Embodiments overcome the above-described and other limitations in the prior art by providing a motor control system with at least seventeen discrete motor speed settings using industry standard control signals and an industry standard five pin speed connector. Embodiments advantageously increase comfort for end-users, allow installers to better control torque for improved airflow, and allow manufacturers to reduce the number of different products they provide and support.

In one embodiment, a control system is provided for controlling operation of an electric motor. The control system may be configured to provide at least seventeen speed settings for a speed of the electric motor, wherein the at least seventeen speed settings are achieved using a standard five pin speed connector including first, second, third, fourth, and fifth pins to communicate via electrical signals with the electric motor. The control system may include one speed monitoring output pin and four speed setting input pins. The speed monitoring output pin of the five pins on the standard five pin speed connector may be configured to transmit an output signal for monitoring the speed of the electric motor. The first, second, third, and fourth speed setting input pins of the five pins on the standard five speed pin connector may be configured to receive input signals for setting the speed of the electric motor, wherein at least one of the four speed setting input pins receives and decodes two binary states and two frequency states.

Various implementations of the foregoing embodiment may include any one or more of the following additional features. The electric motor may be a blower motor in a heating, ventilation, and air conditioning system. The two frequency states are sixty Hertz and one hundred twenty Hertz. In a first implementation, within the standard five pin speed connector a transmit circuitry on the fourth pin may be eliminated to make the fourth pin an open collector, and a direct current bias network on the fifth pin is eliminated, which liberates the fifth pin to be the fourth speed setting input pin. In a second implementation, the control system further includes a standard four pin power connector including a reference voltage pin, and within the standard five pin speed connector all optocouplers may be eliminated except for a first optocoupler associated with a receiving circuit and a second optocoupler associated with a transmitting circuit, a power supply may be replaced with an isolated flyback power supply, which liberates the reference voltage pin to be the fourth speed setting input pin. In a third implementation, a non-regulated isolated winding may be added to a main transformer in the electric motor to provide an isolated power supply, the non-regulated isolated winding may be used to provide a direct current bias on the reference voltage pin for a transmission circuit associated with the first speed monitoring output pin for transmitting an output signal for monitoring the speed of the electric motor, which liberates the fifth pin to be the fourth speed setting input pin.

This summary is not intended to identify essential features of the present invention, and is not intended to be used to limit the scope of the claims. These and other aspects of the present invention are described below in greater detail.

BRIEF DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments provide a motor control system with at least seventeen motor speed settings using industry standard control signals and an industry standard five pin speed connector to communicate via electricals signals with an electric motor. Embodiments advantageously increase comfort for end-users, allow installers to better control torque for improved airflow, and allow manufacturers to reduce the number of different products they provide and support. Potential applications for the control system include controlling blower motors for driving blowers HVAC units.

Figure 1:
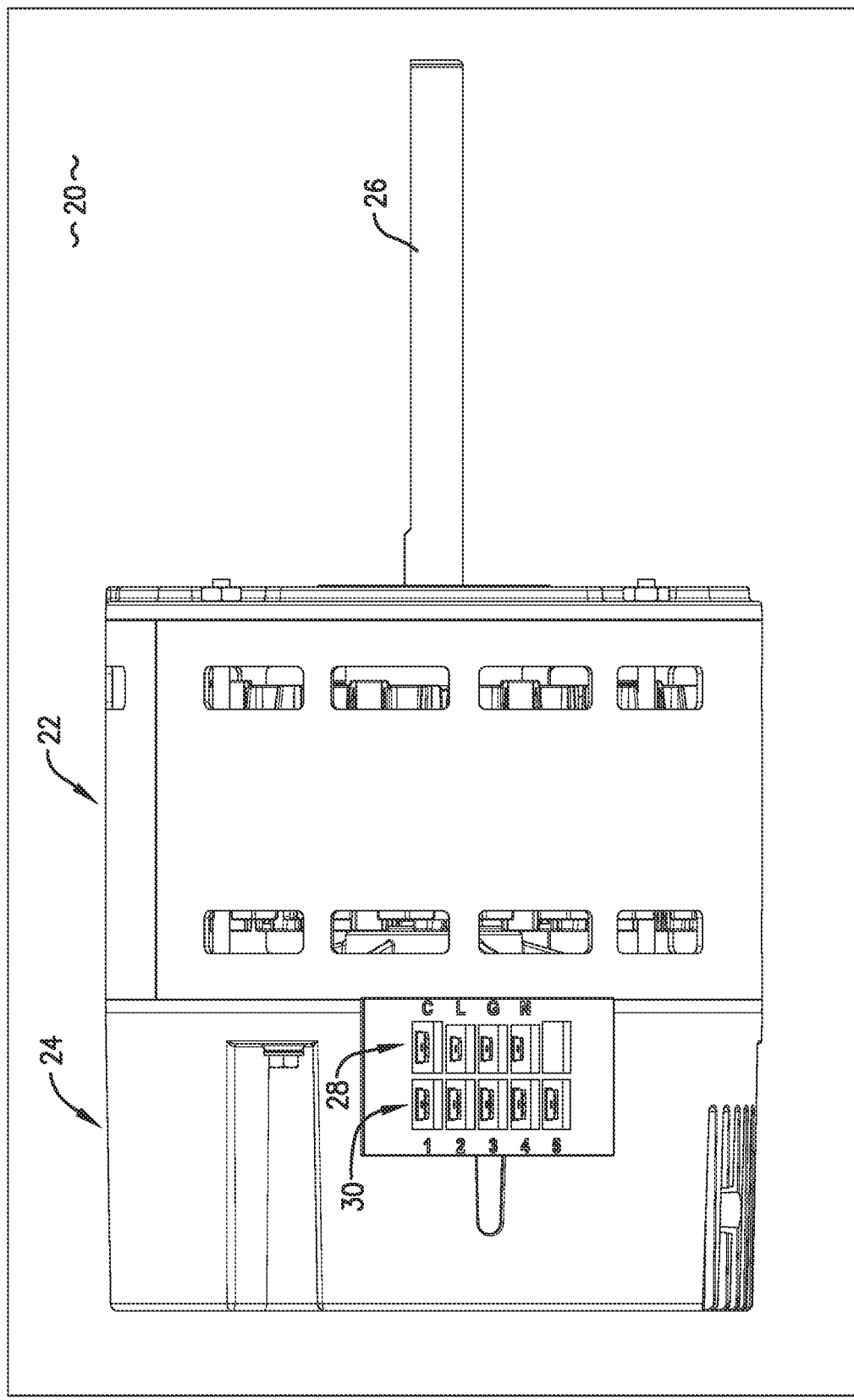
FIG. 1 is a depiction of an embodiment of a motor control system with at least seventeen motor speed settings using industry standard control signals and an industry standard five pin speed connector, wherein the motor control system is shown operationally coupled with an example electric motor for driving a load such as a blower in an HVAC system.
Figure 2:
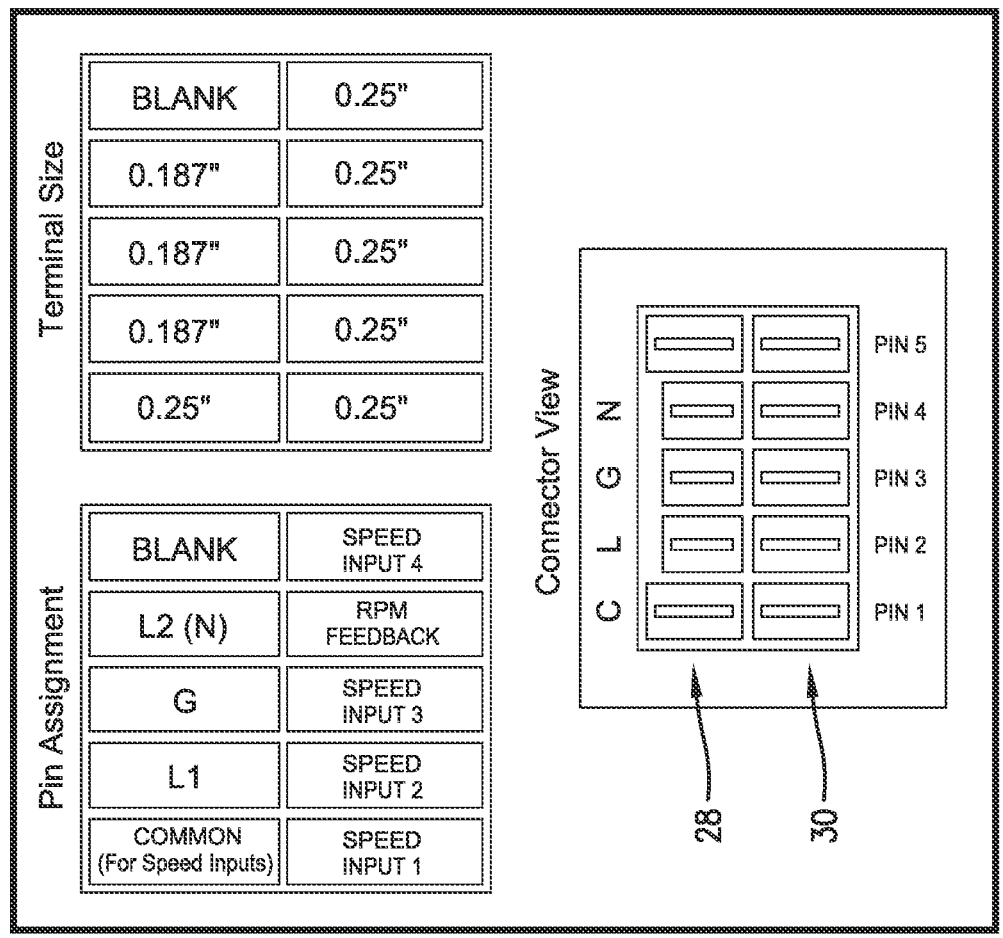
FIG. 2 is a diagram of power connector and speed connector components of the motor control system of FIG. 1, showing input and output pins for the connectors.

Referring to FIG. 1, an example HVAC system 20 may include an electric motor 22 including a shaft 26 for driving a load such as a blower component of the system 20. The motor 22 may be coupled with a motor control system 24 for controlling operation of the motor 22. Referring also to FIG. 2, the motor control system 24 may include two connectors, a power connector 28 and a speed connector 30. These may be industry standard connectors (i.e., connectors of standard designs that are currently widely used in the industry and understood by those with ordinary skill in the relevant art), such as the positive lock HVAC motor connectors available from, e.g., TE Connectivity Ltd. (formerly Tyco Electronics). The power connector 28 may have four pins, or "taps," for line (L), ground (G), and neutral (N) connections for one hundred twenty/two hundred forty VAC input power, and reference voltage or common (C). The speed connector 30 may have five pins, PIN1, PIN2, PIN3, PIN4, and PIN5. PIN1 may be a receive (Rx) pin for receiving signals, and PIN4 may be a transmit (Tx) pin for sending signals. In the prior art, two of the five pins are used to monitor the speed of the motor 22 and three are used to set the speed of the motor 22. Three speed setting inputs allow for eight binary states and therefore a maximum of eight speed settings.

Embodiments of the present invention liberate one of the two speed monitoring pins or the reference voltage pin of the speed connector 30 for use as a fourth speed setting pin, leaving only one pin for monitoring speed. Four speed setting inputs allow for sixteen binary states and therefore sixteen speed settings. Additionally, embodiments provide two binary states and two frequency states on at least one of the speed setting pins to allow for a total of thirty-two states and therefore, potentially, thirty-two speed settings (i.e., at least seventeen motor speed settings). In one implementation, the two frequency states may be sixty Hz (one-half wave rectified) and one hundred twenty Hz (full-wave rectified), while in other implementations other frequencies may be used. Thus, at least one of the four speed pins may have four possible states: on, off, sixty Hz, and one hundred twenty Hz.

In one example implementation, the speed connector 30 of the motor control system 24 may provide the four speed setting pins configured to receive DC or logic pulse input signals, with a logic "high" voltage of eighteen V minimum, twenty-four V nominal, and thirty V maximum, a logic "low" voltage of one V or less, and a typical current of between five mA and twenty mA. At least one of the speed setting pins may be further configured to also receive an additional AC input signal which may be sixty Hz or one hundred twenty Hertz, but otherwise have the same electrical characteristics as the DC input signals. The speed connector 30 may further provide one speed monitoring pin configured as an open collector output, with a maximum voltage of thirty V, a maximum sink current of twenty mA, and a logic "low" voltage of one point two V or less.

Figure 3:
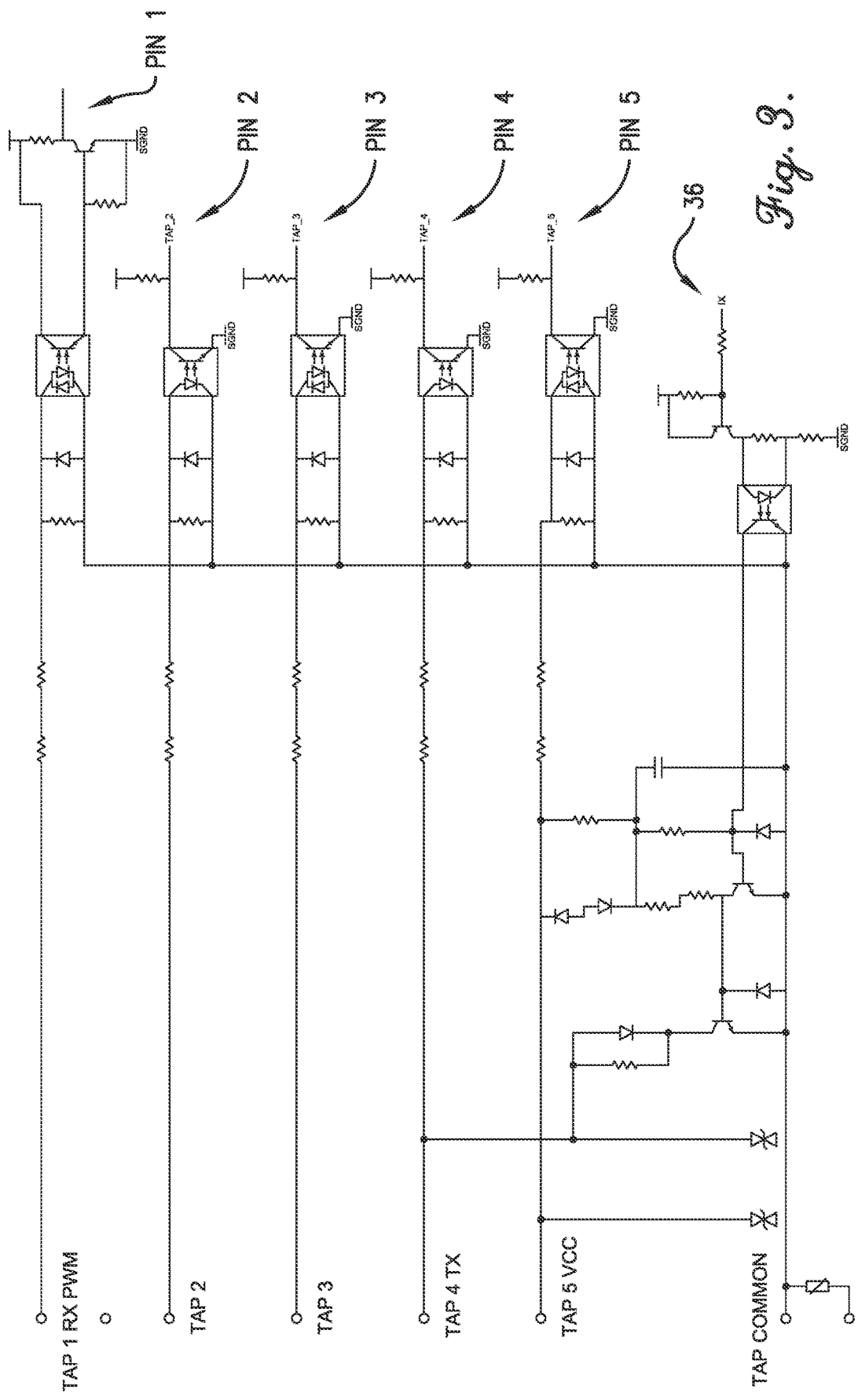
FIG. 3 is a high level circuit diagram of a first implementation of the motor control system of FIG. 1.

In a first implementation, shown in FIG. 3, a fourth pin may be liberated for use in setting the speed of the motor 22 as follows. Broadly, within the standard five pin speed connector a transmit circuitry on the fourth pin may be eliminated to make the fourth pin an open collector, and a direct current bias network on the fifth pin may be eliminated, which liberates the fifth pin to be the fourth speed setting input pin. In more detail, in the standard speed connector 30, PIN4 has an optocoupler, and PIN5 connects to a user-supplied DC bias network. In this first implementation, the transmit circuitry of PIN4 may be removed to make it an open collector, and the DC bias network may be removed, thereby liberating PIN5 for use as the fourth speed setting input pin. Additional protection circuitry may be added as desired or needed.

Figure 4:
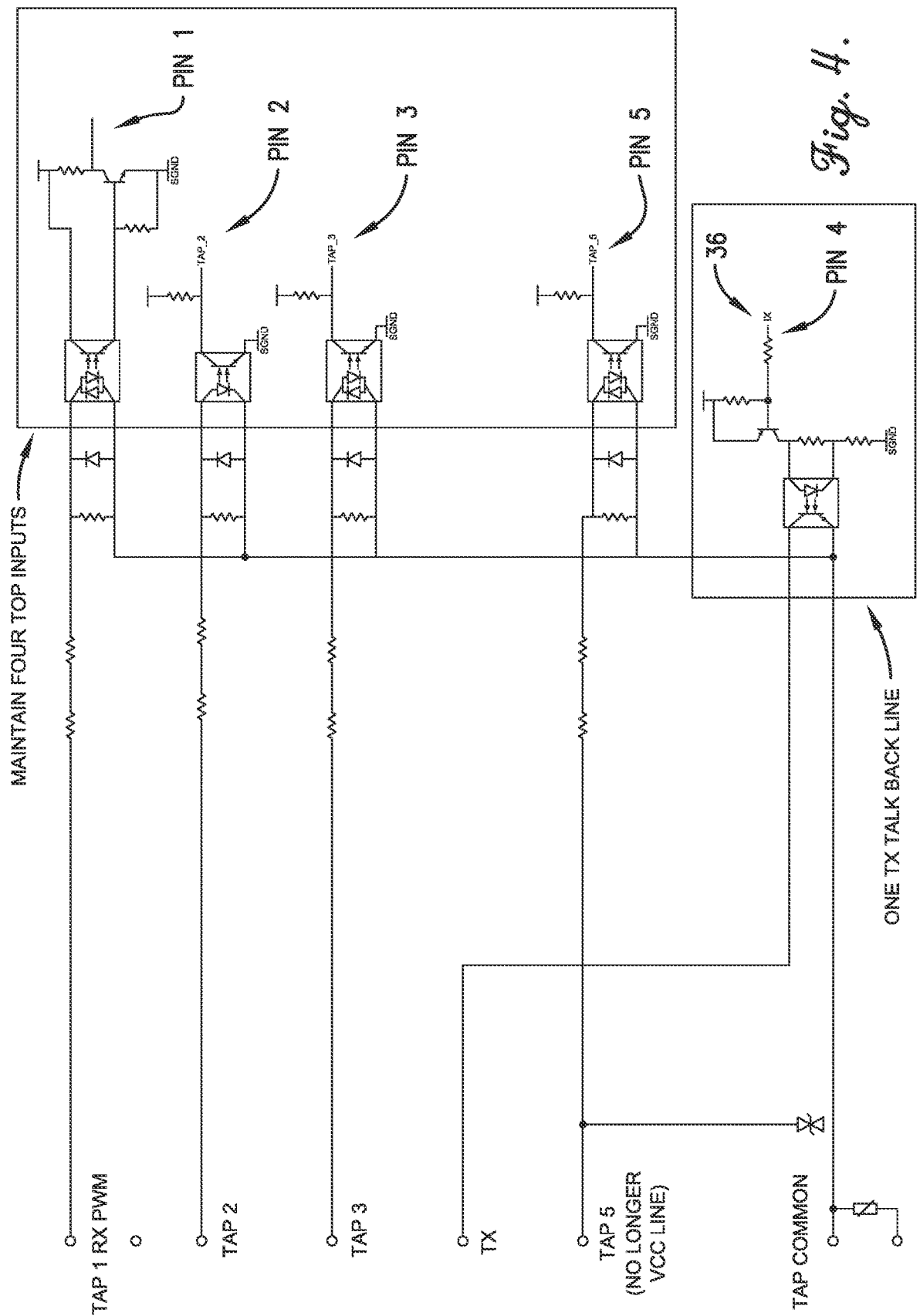
FIG. 4 is a high level circuit diagram of a second implementation of the motor control system of FIG. 1.

In a second implementation, shown in FIG. 4, the fourth pin may be liberated for use in setting the speed of the motor 22 as follows. As discussed, the control system further includes a standard four pin power connector including a reference voltage pin. Broadly, within the standard five pin speed connector all optocouplers may be eliminated except for a first optocoupler associated with a receiving circuit and a second optocoupler associated with a transmitting circuit, a power supply may be replaced with an isolated flyback power supply, which liberates the reference voltage pin to be the fourth speed setting input pin. In more detail, an "on board" modular connector may be incorporated. All but two optocouplers may be removed, with one retained for receiving and one retained for transmitting. The power supply may be changed to an isolated flyback power supply used on the modular connector. A small microprocessor having more input pins may be added, and a three and three-tenths V switching power supply or three and three-tenths V linear regulator may be added to provide power to the microprocessor. The tap inputs may be modified to be three and three-tenths V compliant. By removing all but two of the optocouplers, this solution allows for thirty-two speed settings while keeping other aspects of the system, such as the negative temperature coefficient (NTC) circuit and the reference sensing circuit, the same.

Figure 5:
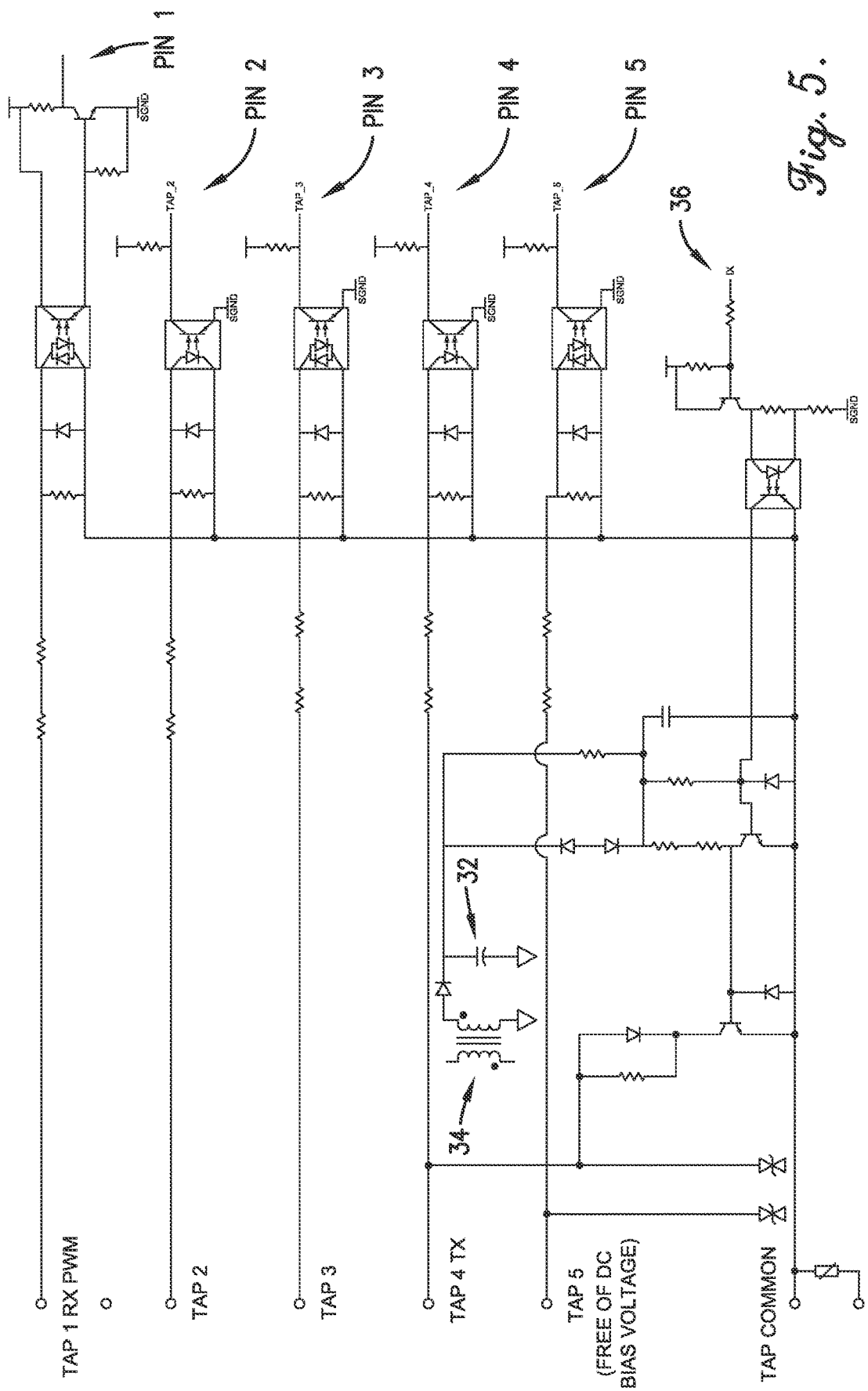
FIG. 5 is a high level circuit diagram of a third implementation of the motor control system of FIG. 1.

In a third implementation, shown in FIG. 5, the fourth pin may be liberated for use in setting the speed of the motor 22 as follows. Broadly, a non-regulated isolated winding may be added to a main transformer in the electric motor to provide an isolated power supply, the non-regulated isolated winding may be used to provide a direct current bias on the reference voltage pin for a transmission circuit associated with the first speed monitoring output pin for transmitting an output signal for monitoring the speed of the electric motor, which liberates the fifth pin to be the fourth speed setting input pin. In more detail, an isolated winding 32 may be added to the main transformer 34 in the motor 22, which provides an isolated power supply. In more detail, the conventional buck configuration may be replaced with an isolated flyback power supply to provide the isolated winding 32. The non-regulated isolated winding output voltage may be used to provide a DC bias on a DC bias line 36 for the Tx circuitry. The transformer 34 may be modified to add more voltage to the non-regulated output winding 32. In the prior art, this power supply is provided by the external HVAC system 20 and occupies one of the available pins on the system connector. Thus, this solution liberates one pin, and provides four pins for receiving and decoding the discrete speed inputs and one pin for providing motor speed feedback and one pin as a signal reference.

It will be understood that the solution of reducing the number of output pins to increase the number of input pins may have applications other than increasing the number of speed settings, and may therefore be separate and distinct from the solution of using more than two states on an input pin to achieve a higher number of speed settings. Similarly, it will be understood that the solution of using more than two states on an input pin may be employed without reducing the number of output pins, and may therefore be separate and distinct from the solution of reducing the number of output pins to increase the number of input pins.

Thus, in one embodiment, the control system may include one output pin on the industry standard five pin speed connector configured to transmit an output signal for monitoring the speed of the electric motor, and four input pins on the industry standard five pin speed connector, wherein at least some but not necessarily all of the four input pins are configured to receive input signals for setting the speed of the electric motor. In another embodiment, the control system may include at least one output pin on the industry standard five pin speed connector configured to transmit an output signal, and at least one input pin on the industry standard five pin speed connector configured to receive an input signal, wherein at least one of the at least one input pin is configured to receive and decode two binary states and two frequency states.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A control system for controlling operation of an electric motor, the control system providing at least seventeen speed settings for a speed of the electric motor, wherein the at least seventeen speed settings are achieved using a standard five pin speed connector including first, second, third, fourth, and fifth pins to communicate via electrical signals with the electric motor, the control system comprising:
   one speed monitoring output pin of the five pins on the standard five pin speed connector transmitting an output signal for monitoring the speed of the electric motor;
   first, second, third, and fourth speed setting input pins of the five pins on the standard five pin speed connector receiving input signals for setting the speed of the electric motor,
   wherein at least one of the four speed setting input pins receives and decodes two binary states and two frequency states; and
   a standard four pin power connector including a reference voltage pin, wherein within the standard five pin speed connector all optocouplers are eliminated except for a first optocoupler associated with a receiving circuit and a second optocoupler associated with a transmitting circuit, a power supply is replaced with an isolated flyback power supply, and the reference voltage pin is the fourth speed setting input pin.

2. The control system of claim 1, wherein the electric motor is a blower motor in a heating, ventilation, and air conditioning system.

3. The control system of claim 1, wherein the two frequency states are sixty Hertz and one hundred twenty Hertz.

4. The control system of claim 1, wherein within the standard five pin speed connector a transmit circuitry on the fourth pin is eliminated to make the fourth pin an open collector, and a direct current bias network on the fifth pin is eliminated, and the fifth pin is the fourth speed setting input pin.

5. The control system of claim 1, wherein a non-regulated isolated winding is added to a main transformer in the electric motor to provide an isolated power supply, the non-regulated isolated winding is used to provide a direct current bias on the reference voltage pin for a transmission circuit associated with the first speed monitoring output pin for transmitting an output signal for monitoring the speed of the electric motor, and the fifth pin is the fourth speed setting input pin.

6. A control system for controlling operation of an electric blower motor, the control system providing at least seventeen speed settings for a speed of the electric blower motor, wherein the at least seventeen speed settings are achieved using a standard five pin speed connector including first, second, third, fourth, and fifth pins to communicate via electrical signals with the electric blower motor, the control system comprising:
   one speed monitoring output pin of the five pins on the standard five pin speed connector transmitting an output signal for monitoring the speed of the electric blower motor;
   first, second, third, and fourth speed setting input pins of the five pins on the standard five speed pin connector receiving input signals for setting the speed of the electric blower motor,
   wherein at least one of the four speed setting input pins receives and decodes two binary states and two frequency states, and the two frequency states are sixty Hertz and one hundred twenty Hertz; and
   a standard four pin power connector including a reference voltage pin, wherein within the standard five pin speed connector all optocouplers are eliminated except for a first optocoupler associated with a receiving circuit and a second optocoupler associated with a transmitting circuit, a power supply is replaced with an isolated flyback power supply, and the reference voltage pin is the fourth speed setting input pin.

7. The control system of claim 6, wherein within the standard five pin speed connector a transmit circuitry on the fourth pin is eliminated to make the fourth pin an open collector, and a direct current bias network on the fifth pin is eliminated, and the fifth pin is the fourth speed setting input pin.

8. The control system of claim 6, wherein a non-regulated isolated winding is added to a main transformer in the electric blower motor to provide an isolated power supply, the non-regulated isolated winding is used to provide a direct current bias on the reference voltage pin for a transmission circuit associated with the first speed monitoring output pin for transmitting an output signal for monitoring the speed of the electric blower motor, and the fifth pin is the fourth speed setting input pin.

9. A control system for controlling operation of an electric motor, the control system providing at least seventeen speed settings for a speed of the electric motor, wherein the at least seventeen speed settings are achieved using a standard five pin speed connector including first, second, third, fourth, and fifth pins to communicate via electrical signals with the electric motor, the control system comprising:

one speed monitoring output pin of the five pins on the standard five pin speed connector transmitting an output signal for monitoring the speed of the electric motor; and first, second, third, and fourth speed setting input pins of the five pins on the standard five speed pin connector receiving input signals for setting the speed of the electric motor, wherein at least one of the four speed setting input pins receives and decodes two binary states and two frequency states, and wherein a non-regulated isolated winding is added to a main transformer in the electric motor to provide an isolated power supply, the non-regulated isolated winding is used to provide a direct current bias on the reference voltage pin for a transmission circuit associated with the first speed monitoring output pin for transmitting an output signal for monitoring the speed of the electric motor, and the fifth pin is the fourth speed setting input pin.

\* \* \* \* \*